United States Patent [19]

Kim

[11] Patent Number: 4,954,764
[45] Date of Patent: Sep. 4, 1990

[54] CIRCUIT AND METHOD FOR POWER EFFICIENCY IMPROVEMENT OF INDUCTION MOTORS

[75] Inventor: Jung-Soo Kim, Suwon, Rep. of Korea

[73] Assignee: SamSung Electronic Co., Ltd., Suwon Kyung Ki-Do, Rep. of Korea

[21] Appl. No.: 139,735

[22] Filed: Dec. 30, 1987

[51] Int. Cl.$^5$ .............................................. H02P 5/40
[52] U.S. Cl. .................................. 318/798; 318/808; 318/811
[58] Field of Search ............... 318/798, 806, 803, 805, 318/807–812

[56] References Cited

U.S. PATENT DOCUMENTS

| | | | |
|---|---|---|---|
| 3,723,840 | 3/1973 | Opal et al. | 318/432 |
| 3,819,992 | 6/1974 | Opal et al. | 318/808 |
| 4,443,750 | 4/1984 | Altena | 318/808 |
| 4,458,194 | 7/1984 | Geppert et al. | 318/811 |
| 4,590,413 | 5/1986 | Gritter et al. | 318/811 |

OTHER PUBLICATIONS

Peacock et al., "A Microprocessor Based System for Testing and Controlling Induction Motors", Conference; Industry Applications Society IEEE—IAS Annual Meeting, Cleveland, OH., U.S.A., 30 Sept.–4 Oct./1979, pp. 902–909.

Primary Examiner—David Smith, Jr.
Attorney, Agent, or Firm—Robert E. Bushnell

[57] ABSTRACT

A circuit and method to improve power efficiency of AC induction motors is described for adopting an AC PWM chopper method in power input controls. For a period of several seconds after initially supplying power source voltage, the starting voltage is bypassed by a relay switch to prevent malfunctioning of devices.

A PWM waveform is provided by a microcomputer and it is combined with a zero crossing signal of the power source voltage. The combined signal is controlled and buffered by photo couplers, by which power source voltage is controlled with transistors of a power controller unit.

A current flow through the motor is detected and store into memory of the microcomputer. In a next sequence, another PWM waveform is provided to again detect other current flow through the motor and its detected value is compared with the previous value store in the memory. These sequences are repeated to search for a minimum current value according to variation of loading on the motor.

18 Claims, 7 Drawing Sheets

CIRCUIT AND METHOD FOR POWER EFFICIENCY IMPROVEMENT OF INDUCTION MOTORS

BACKGROUND OF THE INVENTION

1. Field of the Invention

This invention relates to power input controls for AC induction motors, particularly to an electronic circuit and method for improving power efficiency of an induction motor which provides optimum controlled voltage in accordance with variation of loading on the motor by employing a micro computer.

2. General Description of the Prior Art

An induction motor employs a principle in which electric power is transferred from primary winding to secondary winding by electro-magnetic induction and converted to motive power for moving the motor. It has been widely used in almost all machines with a wide range of power capacity, because it can be used directly without any additional transformer equipment by using AC line voltage installed in a local power utility of every factory, it is easy to operate owing to its simple structure, and also it is cheap.

But due to its rapidly decreasing characteristic of power factor in light loading, it requires improving its power factor in accordance with rate of loading. Accordingly TRIAC's have been employed in prior induction motors to control phase and improve efficiency. This method is shown in U.S. Pat. No. 4,052,648, in which, however, it should be controlled manually according to loading, it generates large vibration torque by input voltage and load current, and it includes higher harmonic components in light loading. Therefore it usually has not been used in precise controlling devices.

OBJECT OF THE INVENTION

It is an object of this invention to provide an electrical circuit capable of employing an alternating current PWM (Pulse Width Modulation) chopper method which provides better power efficiency than a phase control method in controlling power input for an induction motor.

Another object of this invention is to provide a method which samples load current through the motor, searches minimum load current by sequentially providing voltage values stored in memory of a microcomputer according to variation of loading on the motor, and apply optimum controlled voltage to the motor to thereby effect its maximum efficiency in operation.

Another object of this invention is to provide a power control system capable of extending the life of devices by minimizing temperature rise of the motor during operation and also saving the cost of electric power by reducing capacity of electric power receiving facility.

SUMMARY OF THE INVENTION

In accordance with the invention to improve power efficiency of an induction motor, an alternating current PWM chopper method is employed. During a specified time duration after initially applying a power source, a starting voltage that could be generated in an initial transient state is bypassed to prevent malfunctioning of devices and protect power controlling components in initial start-up. An initial PWM wave is developed by providing interrupter signals to a microcomputer an zero crossing points of an AC power source and combined with zero crossing signals. This combined signal is controlled and buffered by a buffer with photo-couplers to control base electrodes of power controlling transistors which drives the power source to the motor. Current flow through the motor is detected and then stored in the microcomputer. Following in a next sequence, another PWM wave is generated to again detect other current flow through the motor, which is compared with the current value stored in the previous current detection sequence. These sequences are repeated to search for a minimum current point and to thereby maintain an optimum state of power efficiency for the motor.

The novel features which are believed to be characteristic of the invention will be better understood from the following description considered in conjunction with the accompanying drawings. The drawings illustrate a presently preferred embodiment of the invention by way of example.

BRIEF DESCRIPTION OF THE DRAWINGS

Like numbers in the various figures refer to like elements.

DETAILED DESCRIPTION OF THE INVENTION

Figure 1:
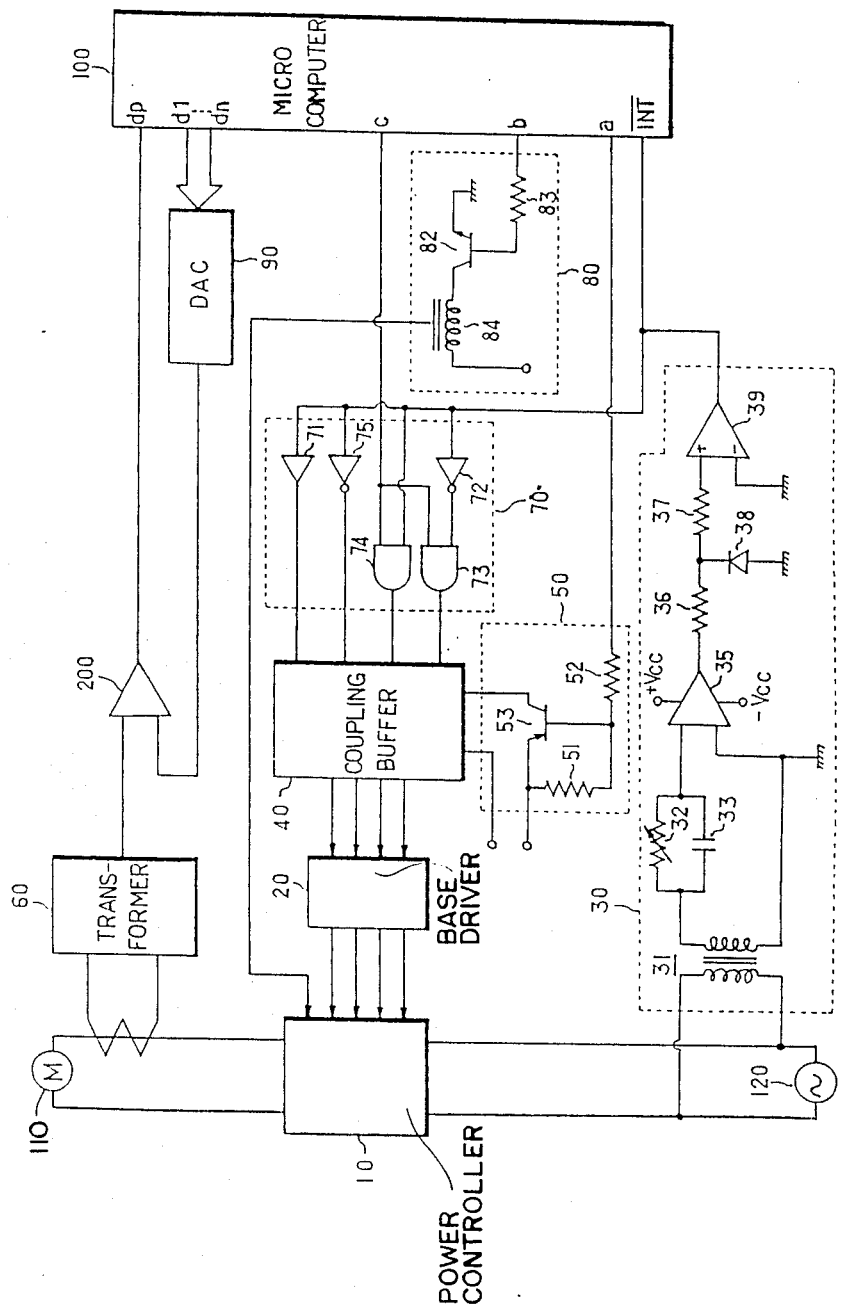
FIG. 1 is an electrical schematic diagram of an embodiment of the invention.

Referring to FIG. 1, AC power source 120 is applied both to power controller unit 10 and primary winding of transformer 31. One terminal of secondary winding of the transformer is grounded and connected to negative input of operational amplifier 35, and another terminal of the secondary winding is connected to positive input of the operational amplifier through variable register 32 and capacitor 33 which are employed to adjust coincidence of zero crossing signal 520 (from detector 30) of AC power source 120 and phase of driving waveform 510 to an induction motor 110. Output of the operational amplifier 35 is connected to positive input of operational amplifier 39 through registers 36, 37 connected to cathode of diode 38 which therein is employed to prevent signal delay, and negative input of the operational amplifier 39 is grounded. Output of the operational amplifier 39 is applied to hardware Interrupter input port $\overline{INT}$ of microcomputer 100 and inputs of inverters 72, 75, buffer 71, and AND gate 73 in combination logic 70. Also, PWM waveform from output port C of the microcomputer is fed to inputs of AND gates 73, 74. Outputs of inverter 72, buffer 71, and AND gates 73, 74 are provided to coupling buffer 40. The micro computer 100 consists of microprocessor CPU, RAM, and ROM. Output port b of the micro computer is connected to the base of transistor 82 through resistor 83. Collector of the transistor 82 is connected to relay 84 and its emitter is grounded.

Outputs of I/O ports $d_1$-$d_n$ of the micro computer 100 are provided to digital/analog converter 90 to convert digital data values to corresponding analog values. Negative input of comparator 200 is connected to the analog output of the D/A converter, its positive input is connected to output of current/voltage transformer 60, and its output is fed to I/O port $d_p$ of the micro computer. The current/voltage transformer converts load current through the induction motor 110 to Voltage and applies its output to the comparator 200.

Figure 2:
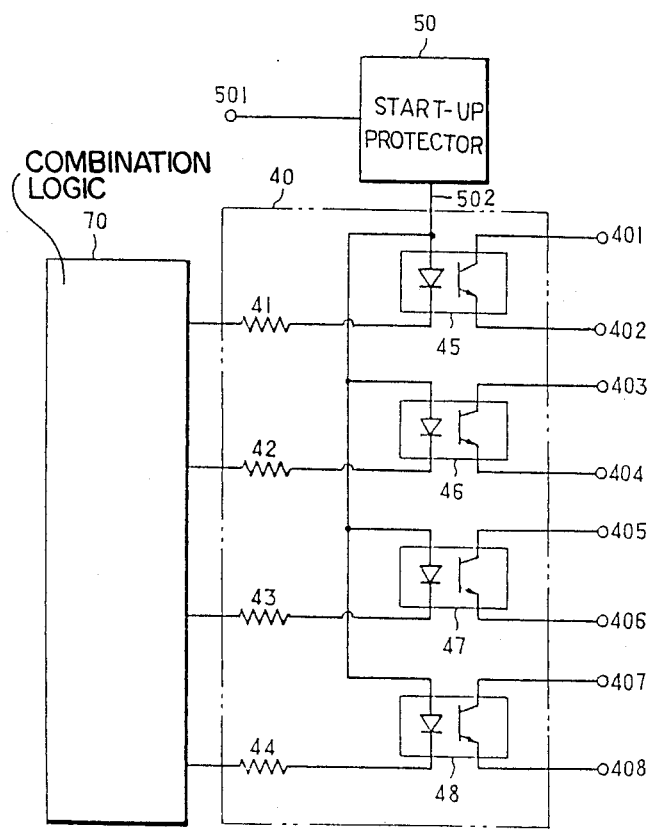
FIG. 2 is a detailed circuit diagram of a coupling buffer illustrated in FIG. 1 in accordance with the invention.
Figure 3:
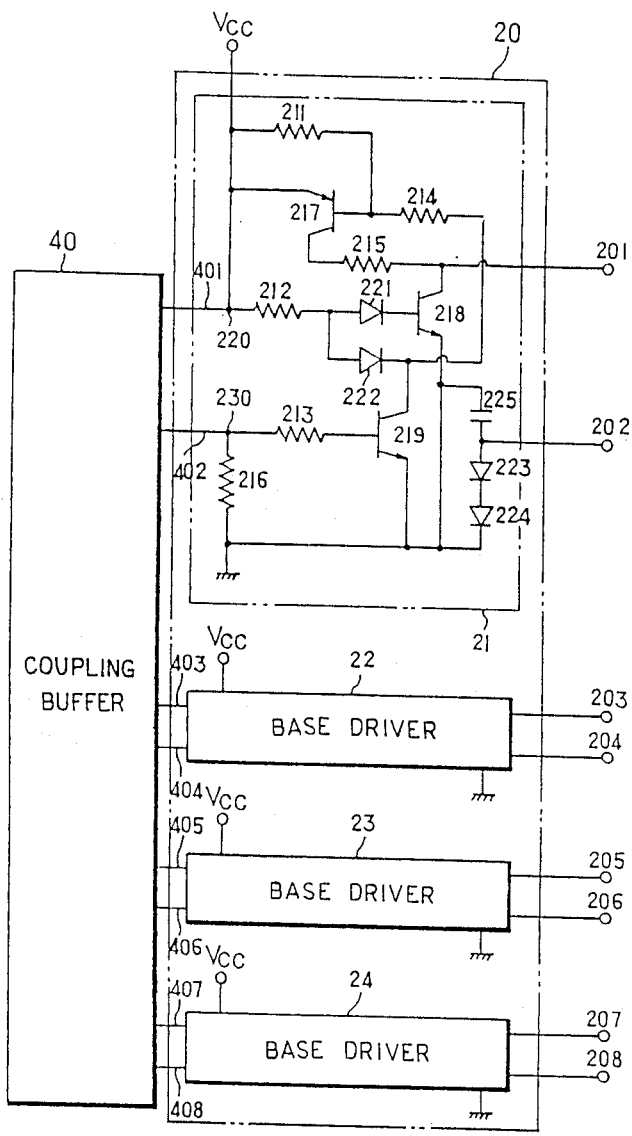
FIG. 3 is a detailed circuit diagram of a base driver unit illustrated in FIG. 1 in accordance with the invention.

Coupling buffer 40 is illustrated in detail in FIG. 2, where outputs of the combination logic 70 are respectively fed to each cathode electrode of light emitting diodes in photo couplers 45-48 by resistors 41-44, as shown in the figure. Each anode electrodes of the light emitting diodes in the photo couplers are connected with output line 502 of Start-up protector 50. Four pairs of collector and emitter electrodes of the photo couplers 45-48 are connected to input terminals of base driver 20 through output lines 401-408. FIG. 3 is a detailed circuit diagram illustrating a configuration of one base driver stage in the base driver Unit 20 comprising four like base driver Stages 21-24, where output through the lines 401, 402 of the photo coupler 45 is fed to node points 220,230, and drives the 1st base driver Stage 21 which consists of resistors 211-216, transistors 217-219, diodes 221-224, and capacitor 225. Outputs through terminals 201-208 are provided to power controller unit 10.

Figure 4:
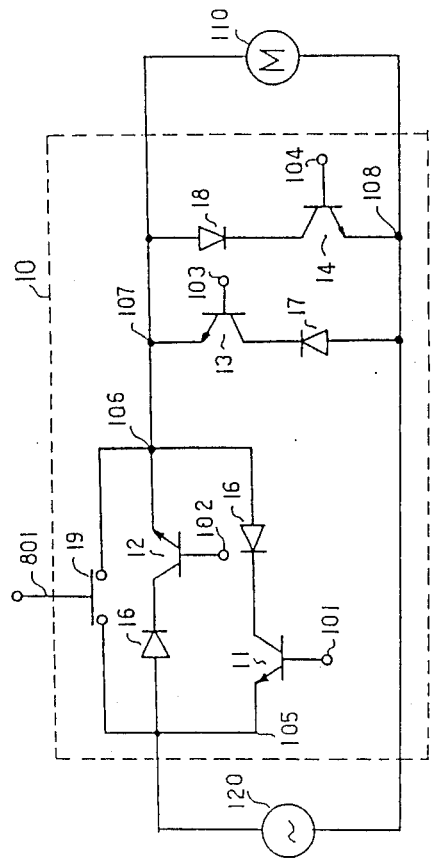
FIG. 4 is a detailed circuit diagram of a power controller unit illustrated in FIG. 1 in accordance with the invention.

Referring to FIG. 4, a detailed circuit diagram of the power controller unit 10, base electrode 101 of transistor 11 is connected to the output terminal 201, and its emitter electrode 105 is connected to the output terminal 202. In the same way as mentioned above, base electrodes 101-104 and emitter electrodes 105-108 of transistors 11-14 are respectively connected with the output terminals 201-208 of the base driver Unit 20. Relay switch 19 is switched by relay 84 through output line 801 of relay controller 80.

Figure 5:
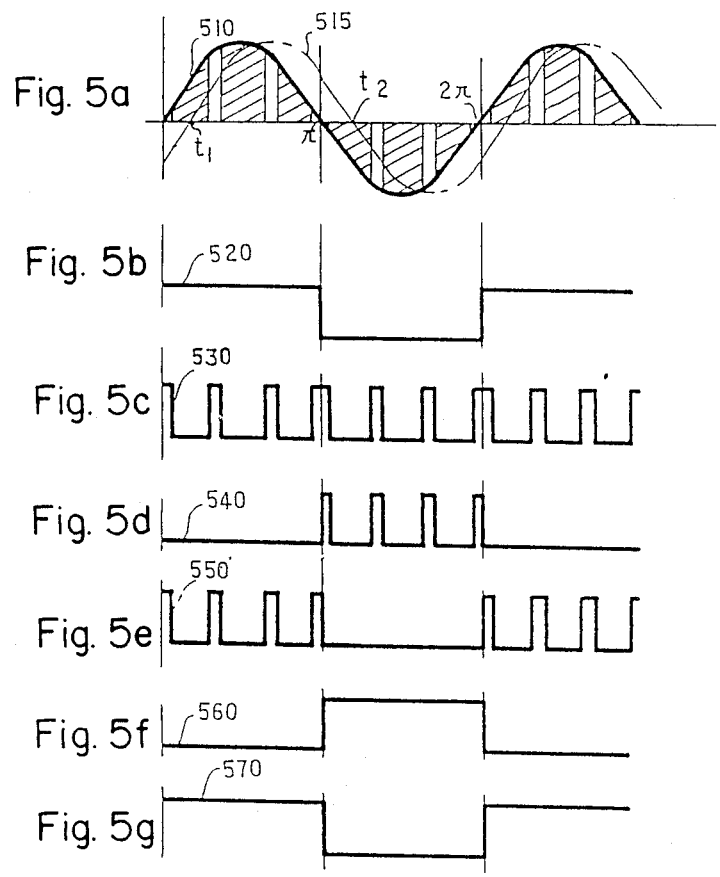
FIGS. 5a–5g are waveforms illustrating aspects of operation of the invention.

FIGS. 5a-5g are waveforms illustrating aspects of operation according to the invention, where waveform 510 shown in FIG. 5a is AC Source Voltage, Waveform 520 is zero crossing signal generated in the zero crossing detector 30, waveform 530 is PWM waveform developed in output port c of the micro computer 100, and waveforms 540-570 are output signals of the combination logic 70, which is subsequently used to drive transistors 11-14 in the power controller Unit 10.

Figure 6:
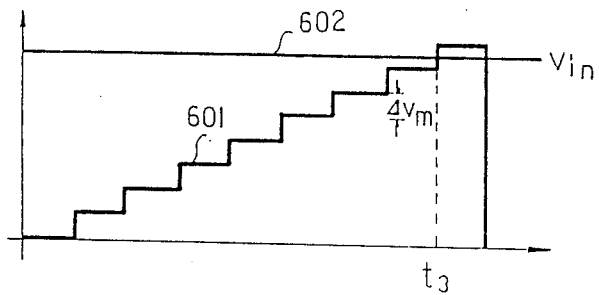
FIG. 6 is a plot illustrating comparison of detected load current values and reference voltages in accordance with the invention.
Figure 7:
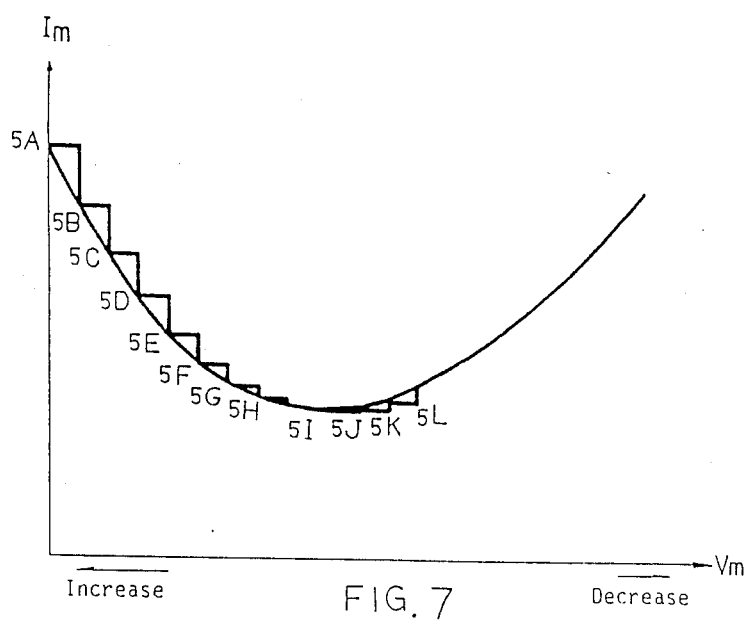
FIG. 7 is a plot illustrating a voltage-current characteristic in accordance with the invention.

In FIG. 6, voltage line 602 represents load current detection value of the induction motor 110 through the current/voltage transformer 60 and waveform 601 represents reference voltage value of the microcomputer 100. FIG. 7 is a plot illustrating voltage-current characteristic curve according to the invention, wherein at its curving point 5I current flow in the motor 110 will become a minimum value so as maintain its optimum efficiency of operation.

To further examine the circuitry referring to the figures mentioned above, when initially supplying power source voltage 120, outputs of I/O ports A,B in microcomputer 100 are set to 'high' state by reset vector of the microcomputer.

The output of I/O port a makes transistor 53 off and by that the photo couplers 45-48 in the coupling buffer 40 are driven off. At this time, as photo diodes of the photo couplers are driven off, output signals of the combination logic 70 do not have any influence on transistors 11, 12, 13, 14 of the power controller unit 10. To bypass large initial current in start-up of the motor 110, the relay controller 80 is employed. The output of I/O port B of the micro computer is initially set to 'high' state, so transistor 82 becomes on and relay 81 is activated in the relay controller 80.

The activated relay sets relay switch 19 in the power controller unit 10 to short-state through switch enable line 801 to thereby bypass the initial starting current through the motor for a period of several seconds.

Figure 8:
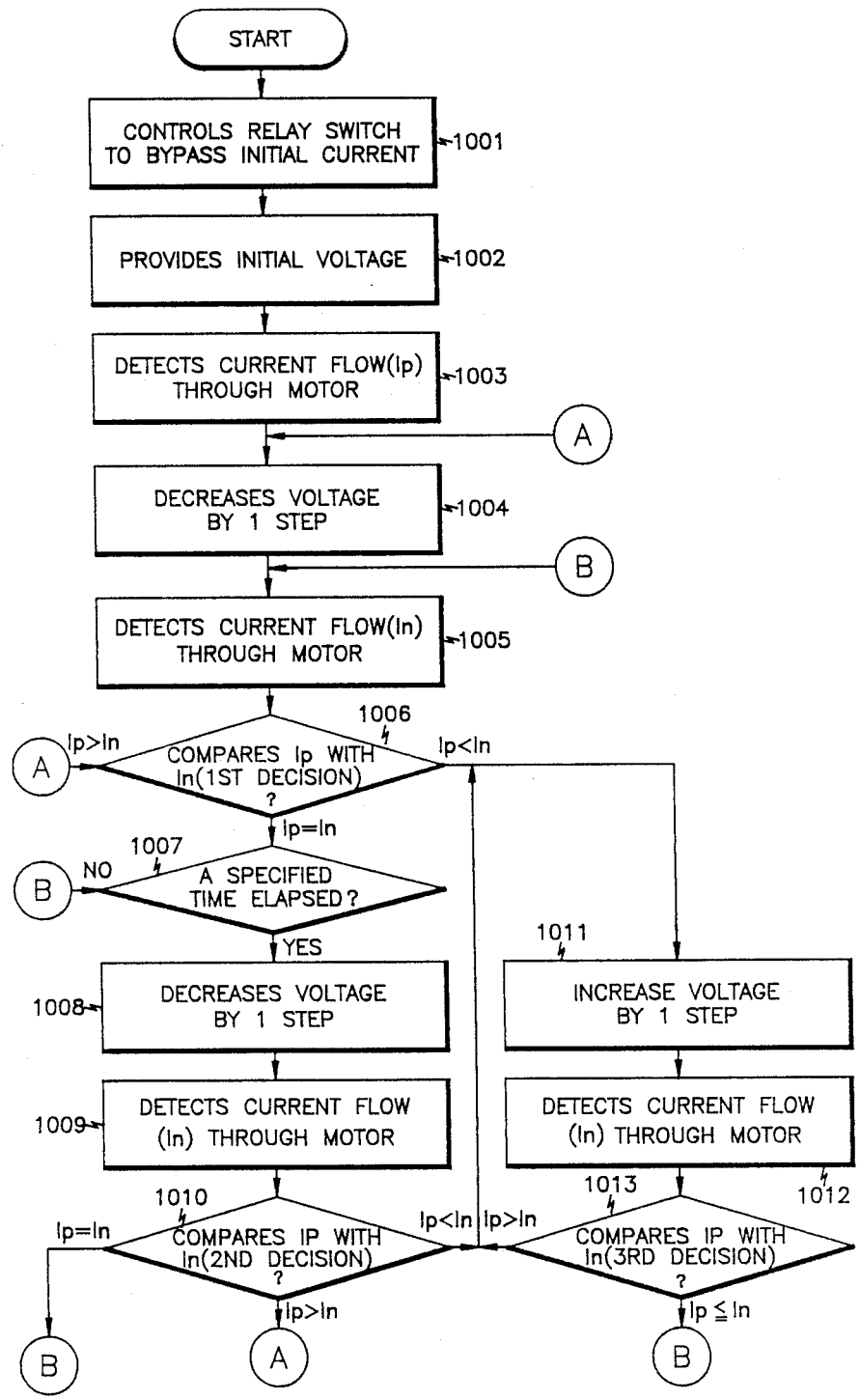
FIG. 8 is a flow diagram of the invention.

After the period of several seconds, following sequences in flow diagram of FIG. 8, operation to search the point 5I in FIG. 7 is executed in the microcomputer. 'Low' signal is provided from the output ports a,b of the microcomputer, by which the relay switch 19 is set to open-state by deactivating the relay 84 through the transistor 82, and the photo couplers 45-48 are driven on by turning on the transistor 53 and thus the coupling buffer 40 starts to function. Also, the microcomputer 100 generates a PWM waveform as shown in FIG. 5c through the output port c.

In the zero crossing detector 30, there are detected all zero crossing points of AC power source waveform 510, and its zero crossing signal 520 is fed to the interrupter port INT of the microcomputer 100 and inverters 72, 75, buffer 71, and AND gate 73,74. By supplying power source ($+V_{CC}$, $-V_{CC}$) to the operational amplifier 35, its response speed will be fast and the distortion of waveforms will be prevented. The operational amplifier 39 is also employed to generate an output signal in accordance with input characteristic of the interrupter port of the microcomputer by amplifying and buffering function. The PWM waveform 530 in the output port C of the microcomputer 100 and the zero crossing signal 520 of the zero crossing detector 30 are combined together in the combination logic 70, wherein output of AND gate 74 is shown in FIG. 5d, output of AND gate 73 is shown in FIG. 5e, output of Inverter 72 is shown in FIG. 5f, and output of buffer 71 is shown in FIG. 5g.

These output waveforms 540, 550, 560, 570 of the combination logic 70 are respectively fed to photo couplers 45-48 through resistors 41-44 in FIG. 2 and are buffered in the photo couplers to drive the base driver unit 20 consisting of 4 stages of base drivers 21-24 through output lines 401-408.

Outputs of the base driver unit are respectively fed to each base electrodes and emitter electrodes of transistors 11-14 in order to turn the transistors on and/or off, wherein the outputs correspond to inverted waveforms of those shown in FIGS. 5d-5g.

After bypassing the initial starting current for a period of several seconds, the relay switch 19 is turned off, and simultaneously transistor 12 performs chopping action in positive section of AC power source. At this time, transistors 11, 13 are in conduction state and transistor 14 is in cut-off state. Referring to 5a, because current 515 flowing through the motor 110 lags voltage 510 in phase, in the section between zero point t-1 it is bypassed through transistor 11, and in the section between point t1 and point $\pi$ reverse electromotive force of the induction motor 110 is free-wheeled through transistor 13 in off state of transistor 12.

Also, in negative section of AC power source, transistor 11 performs the chopping action, transistors 12, 14 are set to conduction state, and transistor 13 is set to cut-off state. In the section between point π and point t2 it is bypassed by transistor 12, and in the section between point t2 and point 2π it is free-wheeled by transistor 14 in off state of transistor 11.

Thus, the chopped voltage of slant-lined portion of FIG. 5a is fed to both ends of the induction motor 110, and subsequently current flow through it is detected by the current/voltage transformer 60, and fed to positive input of the comparator 200 after being transformed into a dc voltage level.

Referring to FIG. 6, dc voltage level 602 represents the output Vin of the current/voltage transformer 60, and step waveform 601 represents the output of the D/A converter 90 which provides reference voltage to the comparator 130 by converting output data of ports $d_1-d_n$ in the microcomputer 100 to its corresponding analog level. For the D/A converter 90, ports $d_1-d_n$ of microcomputer 100 sequentially provide each high output. In time t3 that output of the comparator 130 goes low and is fed to input port $d_p$ in the microcomputer 100, the data values of port $d_1-d_n$ are read into memory in the microcomputer 100, wherein they are equivalent to that of the current flow through the motor 110 converted to its corresponding digital data.

PWM waveforms are generated in the microcomputer 100 as follows. Pulse-width-modulated data in accordance with pre-set voltage steps are stored into memory of the microcomputer 100. The voltage steps to be controlled by PWM data characteristic are developed in Fourier Series.

Time axis in a period of AC source voltage is divided into spans of $2^n$, and then on/off sections of the PWM waveform are decided in accordance with each voltage step. Amounts of spans corresponding to the on/off sections are stored into the memory in sequence. Generation of PWM waveforms in the microcomputer 100 is achieved with use of hardware interrupter and timer interrupter in the microcomputer 100, where the hardware interrupter performs an interrupter function only on the falling edge of the zero crossing signal 520 to input port $\overline{INT}$. At this time, memory location of the PWM waveform in accordance with the voltage step is searched, and by continuously counting inner oscillation frequency with operation of the timer interrupter, there is repeatedly generated a period of AC PWM waveform.

FIG. 8 is a flow diagram according to the invention. For a period of several seconds in initial power supplying it is bypasses the starting current by conducting relay switch 19 to prevent destruction of power controlling componts, and after the period it is applied as the initial power source voltage to the induction motor 110 by setting the relay switch to open-state and simultaneously generating PWM waveforms to control the transistors of the power controller unit 10. After applying the initial voltage to the motor, it is detected the current flow through the motor, and converted into an analog value in the D/A converter 90 and the comparator 130. The analog value (called Ip here) is stored into the microcomputer 100 and then there is provided another PWM waveform in which voltage is decreased by 1 step. By this decreased PWM waveform, another current flow through the motor is detected and then converted to a digital value (called In here). In the microcomputer, the value In is compared with the value Ip.

The above procedure is 1st decision process 1006 in FIG. 8. If Ip>In, In is replaced by Ip and there is branched back to voltage decrease process 1004 which provides PWM waveform decreased by 1 step. If Ip=In, it is decided by the microcomputer whether a specified time is elapsed or not.

Herein, if time has not elapsed completely, then it is branched back to current detection process 1005 to again perform another current detection operation and its decision.

Next, if time has elapsed, then the PWM waveform is decreased by 1 step voltage, fed to the motor and current flow (In) through the motor is detected.

This procedure is to decide instant variation of power source voltage. In 2nd decision process 1010 where in the case that Ip is equal to In, voltage is decreased in a specified time and the detected current value In is compared with Ip. If Ip>In, then it is branched back to the voltage decrease process 1004, and if Ip=In, then branched back to the current detection process 1005.

However, if Ip<In, it is branched to voltage increase process 1011 without any changing of the value Ip stored in the microcomputer. Also, in the above 1st decision 1006, if Ip<In, Ip is replaced by In and stored into the microcomputer, and then PWM waveform increased by 1 step voltage is provided from the microcomputer.

In this time the current flow In in the motor is detected, and thus compared with Ip stored in the microcomputer, whereby 3rd decision process 1013 is achieved.

In the 3rd decision, if Ip>In, then it is branched back to the voltage increase process 1011, and if Ip≦In, then branched back to the current detection process 1005.

Referring now to the above mentioned 1st, 2nd, and 3rd decision processes, operation in FIG. 3 is described as follows.

In case that branched back to the voltage decrease process 1004 by the 1st decision 1006, the state of the induction motor is located in section between point 5A and point 5I, and in case that branched back to the voltage increase process 1011, it is located in section between point 5I and point 5L.

In case that branched back again to the voltage increase process 1011 in performing the 3rd decision process 1013 after being branched to the voltage increase process 1011 from the 1st decision 1006, its state is on the way of being moved from point 5L to point 5I, and in case of being branched back to the current detection process 1005 the 1st decision process is achieved once again.

Also, in the 1st decision, if Ip=In, its state is located at point 5I, where optimum decision will be made.

Herein, if no variation within a specified time occurs, then by decreasing its voltage by 1 step it is confirmed that any influences by ΔVm in FIG. 2 and variation of power source voltage.

In the 2nd decision, in case that branched back to the voltage decrease process 104 the state of the motor is located in section between point 5A and point 5I, and in case that branched back to the voltage increase proces 1011 the status is located in section between point 5I and point 5L.

As mentioned above, by performing automatically the optimum voltage control in accordance with loading on an induction motor employing an AC PWM chopper method, energy can be effectively saved maximizing its operation efficiency.

Also, by operating the motor with minimum current its temperature rise can be minimized to thereby extend the life of device, and reduction in capacity of electric power facility can be effectively achieved.

Having thus described this invention, what is claimed is:

1. In a power control system equipped with a microcomputer consisting of a separate ROM and RAM memory and a microprocessor to execute instructions and an AC induction motor, an electronic circuit for improving power efficiency, comprising:

power controller means for making induction current free-wheeling and for controlling source voltage input to maintain an optimum state in accordance with loading by performing alternating PWM chopping;

zero-crossing detector means for generating a zero crossing signal of a definite pulse width at zero crossing points of an alternating voltage waveform;

starting protector means for preventing destruction of a device by bypassing starting current through an induction motor during an initial transient state;

relay controller means for controlling said starting protector means to bypass said starting current for a specified period of time during an initial start-up;

combination logic means for combining said zero crossing signal with a PWM waveform to produce first output signals;

coupling buffer means for controlling and buffering said first output signals from said combination logic means to provide second output signals;

base driver means for controlling said power controller means with said second output signals from said coupling buffer means;

current/voltage converter means for detecting load current of said induction motor and converting said load current to voltage;

digital/analog converter means adapted to convert digital reference data into analog values;

a comparator to compare said voltage converted in said current/voltage converter means with said analog value of said digital/analog converter means; and a microprocessor coupled to receive said zero crossing signal, provide a transient state indicating signal to said relay controller means, receive a comparison signal provided by said comparator means by comparing said voltage converted in said current/voltage converter means with said analog value, provide and periodically vary on the basis of said comparison signal provided by said comparator means the value of said digital reference data to said digital/analog converter means, and provide said PWM waveform to said combination logic means in response to reception of said zero crossing signal.

2. An efficiency improvement process for an induction motor in which PWM data is memorized for optimum controlled voltage according to variation of loading on said induction motor, load current value through said induction motor is detected, zero-crossing points of an AC input source voltage are detected, and by setting up starting delay time during an initial state and comparing said detected load current value of the induction motor with memorized reference data, said motor is consequently operated in an optimum state, comprising:

controlling a relay to protect devices by bypassing starting current through said motor for a specified period of time during an initial starting state;

applying an initial voltage to said induction motor by cutting off said relay for a few seconds and generating a PWM waveform in said controlling step;

detecting a first value representing load current through said induction motor, converting the load current to voltage, and storing the voltage into memory;

detecting a second value representing load current through said induction motor by providing a PWM waveform decreased by one step;

comparing said first and second values;

repeating said first value detecting step if said first value detected in said first value detecting step is larger than said second value detected in said second value detecting step, and detecting a third value representing load current by providing a PWM waveform having a voltage decreased by one step after checking elapse of a specified period of time if said first and second values are equal;

comparing said third current value detected with said current value stored in memory, and if equal, then repeating said second value detecting step, if said stored current value is larger than said third value, then repeating said first value detecting step, and if said stored value is smaller than said third value, then increasing voltage by one step where instant variation of load current is checked;

determining if said detected value of said first value is smaller than said detected value of said second value, then detecting a fourth value representing a load current through said induction motor after providing a PWM waveform having a voltage increased by one step;

comparing said fourth detected value with said stored value, and if said fourth detected value is smaller than said stored value, then increasing said voltage by one step, and if equal or larger, then repeating said second value detecting step.

3. The power control system of claim 1, wherein said zero-crossing detector means comprises:

reactive means coupled in parallel with said power controller means across a source of alternating electrical voltage exhibiting said alternating voltage waveform, for providing indication of said zero crossing points;

adjustable impedance means coupled to receive said indication, for adjusting coincidence of said indication and phase of said alternating voltage waveform;

first and second amplifying means for amplifying output of said adjustable impedance means to provide said zero crossing signal to said combination logic means and to said microprocessor.

4. The power system of claim 3, further comprising rectification means coupled between said first and second amplifying means and a reference potential, for preventing delay of said zero crossing signal.

5. The power control system of claim 1, wherein said zero crossing signal has two logical states, and said combination logic means comprises:

amplifier means for providing a first node coupled to receive said zero crossing signal, and for providing a first of said first output signals exhibiting a first logic state in response to occurrence of a first logical state of said zero crossing signal;

an inverter coupled to said first node, for providing a second of said first output signals exhibiting a second logic state in response to the absence of said first logical state of said zero crossing signal;

first logic means having a first terminal coupled to said first node and a second terminal coupled to receive said PWM waveform, for providing a first PWM signal as a third one of said first output signals; and second logic means having a first terminal coupled to receive said zero crossing signal and a second terminal coupled to receive an inverse of said PWM signal, for providing a second PWM signal as a fourth one of said first output signals.

6. The power control system of claim 3, wherein said zero crossing signal has two logical states, and said combination logic means comprises:

amplifier means for providing a first node coupled to receive said zero crossing signal, and for providing a first of said first output signals exhibiting a first logic state in response to occurrence of a first logical state of said zero crossing signal;

an inverter coupled to said first node, for providing a second of said first output signals exhibiting a second logic state in response to the absence of said first logical state of said zero crossing signal;

first logic means having a first terminal coupled to said first node and a second terminal coupled to receive said PWM waveform, for providing a first PWM signal as a third one of said first output signals; and second logic means having a first terminal coupled to receive said zero crossing signal and a second terminal coupled to receive an inverse of said PWM signal, for providing a second PWM signal as a fourth one of said first output signals.

7. The power control system of claim 1, wherein said coupling buffer means comprises a plurality of substantially identical stages, each transferring via photocouplers, a different one of said first output signals to said base driver means.

8. The power control system of claim 3, wherein said coupling buffer means comprises a plurality of substantially identical stages, each transferring via photocouplers, a different one of said first output signals to said base driver means.

9. The power control system of claim 5, wherein said coupling buffer means comprises a plurality of substantially identical stages, each transferring via photocouplers, different ones of said first one, second one, third one and fourth one of said first output signals via photocouplers to said base driver means as said second output signals.

10. A power control system, comprising:

power controller means connectable between an alternating current induction motor and a source of alternating electrical voltage exhibiting an alternative voltage waveform, for controlling application of said alternating electrical voltage from the the source to the motor in dependence upon characteristics of a plurality of control signals;

zero crossing detector means for generating a zero crossing signal having distinct logical states each exhibiting a pulse width coinciding in duration with duration of said alternating voltage waveform between zero crossing points;

comparator means for detecting electrical current flowing between said power controller means and the motor, and for generating a comparison signal by comparing a first voltage proportional to said electrical current and a second voltage obtained from reference data;

processor means storing PWM data defining PWM waveforms corresponding to each said second voltage obtained from said reference data, coupled to receive said zero crossing signal, to receive said comparison signal, and to provide said reference data to said comparator means on the basis of the value of said comparison signal, for in response to reception of said zero crossing signal, providing to said comparator means and periodically varying on the basis of said comparison signal, and value of said second voltage obtained from said reference data, and for in response to reception of said zero crossing signal, generating a PWM waveform from said PWM data corresponding to the value of said second voltage obtained from said reference data when said comparison signal is generated by said comparator means; and logic means connected between said power controller means and said processor means, for receiving said zero crossing signal and said PWM waveform and providing to said power controller means a first control signal exhibiting a first logic state in response to the occurrence of a first logical state of said zero crossing signal, a second control signal exhibiting a second logic state in response to the absence of said first logical signal of said zero crossing signal, a first PWM waveform as a third control signal, and a second PWM waveform as a fourth control signal.

11. The power controller of claim 1, wherein said logic means provides said third control signal in response to occurrence of said first logical state of said zero crossing signal and said fourth control signal in response to the absence of said first logical state of said zero crossing signal.

12. The power control system of claim 10, wherein said zero-crossing detector means comprises:

reactive means coupled in parallel with said power controller means across a source of alternating electrical voltage exhibiting said alternating voltage waveform, for providing indication of said zero crossing points;

adjustable impedance means coupled to receive said indication, for adjusting coincidence of said indication and phase of said alternating waveform; and first and second amplifying means for amplifying output of said adjustable impedance means to provide said zero crossing signal to said logic means and to said processor means.

13. The power system of claim 12, further comprising rectification means coupled between said first and second amplifying means and a reference potential, for preventing delay of said zero crossing signal.

14. The power control system of claim 10, wherein said zero crossing signal has two logical states, and said logic means comprises:

amplifier means for providing a first node coupled to receive said zero crossing signal, and for providing said first control signal exhibiting said first logic state;

an inverter coupled to said first node, for providing said second control signal exhibiting said second logic state;

first logical means having a first terminal coupled to said first node and a second terminal coupled to receive said PWM waveform, for providing said first PWM signal as said third one of said control signals; and second logical means having a first terminal coupled to receive said zero crossing signal and a second terminal coupled to receive an inverse of said PWM signal, for providing said second PWM signal as said fourth one of said control signals.

15. The power control system of claim 12, wherein said zero crossing signal has two logical states, and said logic means comprises:

amplifier means for providing a first node coupled to receive said zero crossing signal, and for providing said first control signal exhibiting said first logic state;

an inverter coupled to said first node, for providing said second control signal exhibiting said second logic state;

first logical means having a first terminal coupled to said first node and a second terminal coupled to receive said PWM waveform, for providing said first PWM signal as said third one of said control signals; and second logical means having a first terminal coupled to receive said zero crossing signal and a second terminal coupled to receive an inverse of said PWM signal, for providing said second PWM signal as said fourth one of said control signals.

16. The power control system of claim 10, wherein said coupling buffer means comprises a plurality of substantially identical stages, each separately transferring via photocouplers, a different one of said control signals to said power controller means.

17. The power control system of claim 12, wherein said coupling buffer means comprises a plurality of substantially identical stages, each separately transferring via photocouplers, a different one of said control signals to said power controller driver means.

18. The power control system of claim 14, wherein said coupling buffer means comprises a plurality of substantially identical stages, each separately transferring via photocouplers, different ones of said first, second, third and fourth control signals via photocouplers to said power controller means.

* * * * *